United States Patent
Mauder et al.

(10) Patent No.: US 9,231,493 B1
(45) Date of Patent: Jan. 5, 2016

(54) RECTIFIER WITH AUXILIARY VOLTAGE OUTPUT

(71) Applicant: Infineon Technologies Austria AG, Villach (AT)

(72) Inventors: Anton Mauder, Kolbermoor (DE); Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/456,470

(22) Filed: Aug. 11, 2014

(51) Int. Cl.
*H02M 7/217* (2006.01)
*H02M 7/34* (2006.01)
*H02M 7/00* (2006.01)

(52) U.S. Cl.
CPC ..................................... *H02M 7/217* (2013.01)

(58) Field of Classification Search
CPC .............. H02M 7/219; H02M 2007/2195; H02M 7/217; H02M 1/088; H02M 1/4208; Y02B 70/1408
USPC ......................................... 363/108, 125, 127
See application file for complete search history.

(56) References Cited

U.S. PATENT DOCUMENTS

| | | | | | |
|---|---|---|---|---|---|
| 4,777,580 | A | * | 10/1988 | Bingham | 363/127 |
| 4,811,191 | A | * | 3/1989 | Miller | 363/127 |
| 4,819,147 | A | * | 4/1989 | Bingham | 363/127 |
| 2009/0257259 | A1 | * | 10/2009 | Leibovitz | 363/89 |
| 2011/0044081 | A1 | * | 2/2011 | Lu | 363/127 |
| 2013/0154492 | A1 | * | 6/2013 | Summerland | 315/200 R |

* cited by examiner

*Primary Examiner* — Adolf Berhane
*Assistant Examiner* — Henry Lee, III
(74) *Attorney, Agent, or Firm* — Murphy, Bilak & Homiller, PLLC

(57) ABSTRACT

A rectifier includes two input paths configured to receive an alternating input voltage, two output paths configured to provide a direct output voltage, and an auxiliary output path configured to provide an auxiliary output voltage. At least two rectifying paths are connected between each of the input and output paths. At least two rectifying paths are switched-mode rectifying paths that are connected to the same output path. The two switched-mode rectifying paths are configured to connect one output path to one input path during one half wave of the input voltage, and to connect the one output path to the other input path during the other half wave. The two switched-mode rectifying paths each comprise two semiconductor elements with controllable paths that are series-connected with each other by an auxiliary output node. At least one rectifier element is connected between the auxiliary output and the two auxiliary output nodes.

25 Claims, 7 Drawing Sheets

US 9,231,493 B1

RECTIFIER WITH AUXILIARY VOLTAGE OUTPUT

TECHNICAL FIELD

The disclosure relates to full-wave rectifiers, in particular to bridge rectifiers.

BACKGROUND

A bridge rectifier is a type of electrical circuit in which four rectifying paths are connected between each of two alternating current (AC) input paths and each of two direct current (DC) output paths to provide the same polarity of output for either polarity of input (half wave). The rectifying paths usually include one or more diodes, which are quite inefficient and considerably reduce the overall efficiency of power conversion from AC energy to DC energy. The inefficiency arises from the forward voltages of the diodes, which may be up to 1 volt or more. As at least two diodes are connected in series at any time during operation of a bridge rectifier, the voltage loss caused by the diodes may approximately be between 0.8 and 2.5% in common power supply circuits with an input voltage between 85 and 265 volts (V). In various applications, an additional auxiliary voltage is required for supplying, e.g., control circuits, stand-by circuits, start-up circuits etc. without involving the whole bridge rectifier. Known auxiliary voltage supply circuits exhibit a considerable power consumption. In combination with bridge rectifiers, auxiliary voltage supply circuits typically increase the overall inefficiency of rectifier systems that also provide auxiliary voltages. The inefficiency caused by the auxiliary voltage supply circuits is often considered to be critically.

SUMMARY

According to an embodiment, a rectifier includes two input paths configured to receive an alternating input voltage, two output paths configured to provide a direct output voltage, and an auxiliary output path configured to provide an auxiliary output voltage. At least two rectifying paths are connected between each of the input paths and each of the output paths. At least two of the rectifying paths are switched-mode rectifying paths. The two switched-mode rectifying paths are connected to the one same output path. The two switched-mode rectifying paths are configured to connect one output path to one input path during one half wave of the input voltage, and configured to connect the one output path to the other input path during the other half wave of the input voltage. The two switched-mode rectifying paths each include two semiconductor elements with controllable paths. The controllable paths of the two semiconductor elements in each of the two switched-mode rectifying paths are series-connected with each other via a corresponding auxiliary output node. At least one rectifier element is connected between the auxiliary output and the two auxiliary output nodes According to another embodiment, a rectifier includes two input paths configured to receive an alternating input voltage, two output paths configured to provide a direct output voltage, an auxiliary output path configured to provide an auxiliary output voltage, and four rectifying paths that are connected between each of the input paths and each of the output paths. Two of the four rectifying paths are switched-mode rectifying paths. The two switched-mode rectifying paths are connected to the one same output path. The rectifying paths are configured to connect one input path to one output path and the other input path to the other output path during one half wave of the input voltage, and configured to connect the first input path to the second output path and the second input path to the first output path during the other half wave of the input voltage. The two switched-mode rectifying paths each include two semiconductor elements with controllable paths. The controllable paths of the two semiconductor elements in each of the two switched-mode rectifying paths are series-connected with each other via a corresponding auxiliary output node. At least one rectifier element is connected between the auxiliary output and at least one of the two auxiliary output nodes.

BRIEF DESCRIPTION OF THE DRAWINGS

These and other aspects are illustrated in the drawings, in which like referenced numerals designate corresponding parts throughout the different views.

DETAILED DESCRIPTION

For the sake of simplicity, all transistors used in the exemplary two-wire full-wave rectifiers described below are metal-oxide-semiconductor field-effect transistors. Alternatively, these transistors can be individually substituted by bipolar transistors, junction field-effect transistors, silicon carbide transistors, gallium nitride transistors, or any other appropriate transistors.

Figure 1:
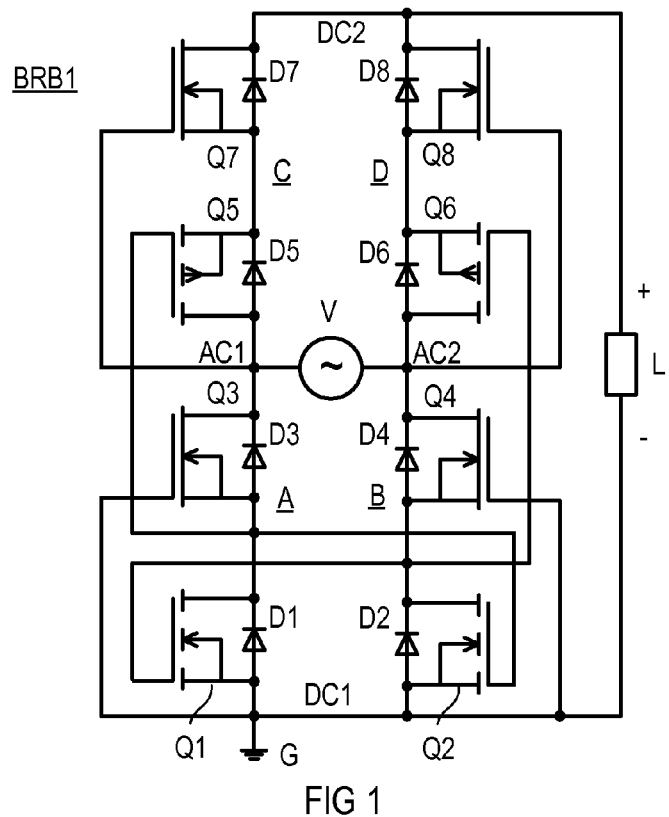
FIG. 1 is a circuit diagram of a full-wave rectifier with two transistors in each rectifying path.

As shown in FIG. 1, an exemplary bridge rectifier BRB1 includes four rectifying paths A, B, C and D, which are connected between each of two AC input paths AC1 and AC2 (connected to an AC source V) and each of two DC output paths DC1 and DC2 (connected to load L). In particular, rectifying path A is connected between input path AC1 and output path DC1, rectifying path B is connected between input path AC2 and output path DC1, rectifying path C is connected between input path AC1 and output path DC2 and rectifying path D is connected between input path AC2 and output path DC2. Output path DC1 in the circuit of FIG. 1 may be connected to ground G. Each of the four rectifying paths A, B, C and D includes a controllable switch, which may be provided by a cascode circuit of a normally-on transistor and a normally-off transistor. A cascode circuit is basically a two-stage amplifier composed of a transconductance amplifier followed by a current buffer. It can be constructed from two series-connected transistors, with one operating as a common source (or a common emitter) and the other as a common gate (or a common base).

The cascode circuits may employ transistors of a single conductivity type (i.e., p-channel or n-channel field-effect transistors) or transistors of different conductivity types (i.e., p-channel and n-channel field-effect transistors). In the bridge rectifier shown in FIG. 1, rectifying paths A and B include only n-channel field-effect transistors, while rectifying paths C and D include both n-channel and p-channel transistors. In particular, rectifying paths A and B may be identically constructed and may include a normally-off n-channel field-effect transistor Q1 or Q2, whose source line is connected to output path DC1 and whose gate line is connected to the drain line of the respective other transistor Q2 or Q1 (common-gate stage of a cascode circuit). In rectifying path A, the drain line of transistor Q1 is connected to the source line of a normally-on n-channel field-effect transistor Q3, whose gate is coupled to output path DC1 and whose drain line is connected to input path AC1 (common-source stage of a cascode circuit). Accordingly, in rectifying path B, the drain line of transistor Q2 is connected to the source line of a normally-on n-channel field-effect transistor Q4, whose gate is coupled to output path DC1 and whose drain line is connected to input path AC2.

Rectifying paths C and D may also be identically constructed. Rectifying path C may include a normally-off p-channel field-effect transistor Q5, whose drain line is connected to input path AC1 (common-drain stage) and whose gate line is connected to the drain line of transistor Q1 in rectifying path A. A normally-off n-channel field-effect transistor Q7 is connected via its source line to the source line of transistor Q5, via its gate line to input path AC1 and via its drain line to output path DC2 (common-gate stage). Rectifying path D may include a normally-off p-channel field-effect transistor Q6, whose drain line is connected to input path AC2 and whose gate line is connected to the drain line of transistor Q2 in rectifying path B. A normally-on n-channel field-effect transistor Q8 is connected via its source line to the source line of transistor Q6, via its gate line to input path AC2 and via its drain line to output path DC2.

Transistors Q1-Q8 may include internal diode-like structures, referred to as body diodes D1-D8, between respective source lines and drain lines of transistors Q1-Q8, whereby in n-channel transistors Q1-Q4, Q7 and Q8, the anodes of the diode-like structures are coupled to the source lines and the cathodes are coupled to the drain lines. In p-channel transistors Q5 and Q6, the cathodes of body diodes D5 and D6 are coupled to the source lines and their anodes are coupled to the drain lines.

When alternating voltage source V provides a voltage with a positive polarity on input line AC1 and a negative polarity on input line AC2, the potential at the source of transistor Q2 (i.e., in output path DC1) is theoretically more positive than that in input path AC2 by approximately the sum of the forward voltages of body diodes D2 and D4. As transistor Q4 is a normally-on transistor, the actual difference of the potentials may only be around the same value as the forward voltage of body diode D2. The voltage occurring between the source line and drain line of transistor Q2 is rather low, so that transistor Q1 receives no relevant gate source voltage and therefore blocks. The voltage between input paths AC1 and AC2 is nearly the same as the voltage between the drain line of normally-on transistor Q3 and the source line of normally-off transistor Q1. In this operating state, both the normally-off transistor Q1 and the normally-on transistor Q3 block and thus divide the voltage between the first input path AC1 and the first output path DC1 at the node between their drain and source lines. The voltage at the drain line of normally-off transistor Q1 also appears between the gate line and source line of normally-off transistor Q2 so that this transistor and the series-connected normally-on transistor Q4 are in a conducting state. In this operating state, the body diodes D2 and D4 are bridged by the conducting drain-source paths of transistors Q2 and Q4, respectively. A current flowing through load L via the first output path DC1 and the input path AC2 may cause a voltage drop between the first output path DC1 and the input path AC2 which is defined by the parallel connection of the body diodes D2 and D4 with the channels of transistors Q2 and Q4, which have ohmic characteristics. The voltage occurring between the drain line and source line of normally-on transistor Q3 is applied inversely to the gate-source path of the normally-off p-channel transistor Q5, which is thus in a conducting state. When normally-off, transistor Q5 is conducting and the series-connected normally-on transistor Q7 is also conducting.

On the other hand, in its conducting state, normally-on transistor Q4 causes the gate voltage of normally-off p-channel transistor Q6 to be low and thus causes transistor Q6 and corresponding series-connected normally-on transistor Q8 to block. Transistors Q6 and Q8 block synchronously with transistors Q1 and Q3 so that the corresponding rectifying paths A and D isolate output paths DC1 and DC2 from input paths AC1 and AC2. In contrast, rectifying paths B and C, which include transistors Q5, Q7, Q2 and Q4, are in an ohmic conducting state so that output paths DC1 and DC2 are switched to paths AC1 and AC2 with only little voltage loss.

When alternating voltage source V provides a voltage with a negative polarity on input line AC1 and a positive polarity on input line AC2, transistors Q2, Q4, Q5 and Q7 (and so the corresponding rectifying paths B and C) are in a blocking state, while transistors Q1, Q3, Q6 and Q8 (and so the corresponding rectifying paths A and D) are in an ohmic conducting state.

In the four-wave rectifier BRB 1 shown in FIG. 1, the drain-source voltage of each transistor directly controls the gate of another transistor. Therefore, all transistors used here may be low-voltage transistors (i.e., transistors with a nominal voltage between 10 and 200 V) if the gates of the normally-on transistors Q3, Q4, Q7 and Q8 feature highly blocking gate oxides. For example, full-wave rectifiers in power supply applications have blocking capabilities of about 800 V to avoid severe damage due to peak voltages that may occur, e.g., in a 230 V/50 Hz power grid, by passing voltage peaks and corresponding current peaks to an intermediate stage capacitor for attenuation. In order to achieve the necessary blocking capabilities, transistors Q1, Q3, Q5 and Q7 may feature asymmetric blocking capabilities. For example, transistors Q1 and Q5 may have a nominal blocking voltage between 30 and 200 V, while transistors Q3 and Q7 can each withstand differential voltages of about 800 V. A higher reverse voltage of the normally-on transistors can be achieved, for example, by means of transistors with blocking voltages of 700-800 V or by series connection of a multiplicity of normally-on transistors with lower blocking voltage capabilities.

Figure 2:
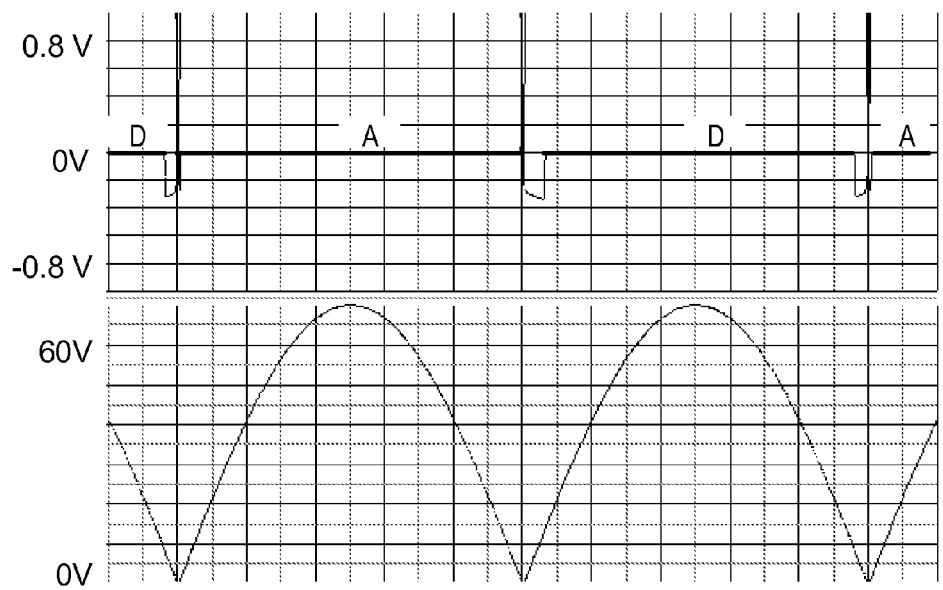
FIG. 2 is a diagram illustrating simulation results of the full-wave rectifier shown in FIG. 1.

FIG. 2 is a diagram depicting simulation results of the rectifier shown in FIG. 1 operated with an alternating input voltage of about 70 V. The top part of FIG. 2 shows in detail the voltage over time at rectifying paths A, C or B, D linked to the same input path AC1 or AC2, whereby the blocking voltage is clipped off in the representation of FIG. 2 for the sake of improved presentability. The bottom part of FIG. 2 shows the full-wave rectified voltage over time at load L. It should be noted that at the signal crossing of the input voltage, the body diodes of transistors Q6 (paths C and D) or Q2 (paths A and B) are initially active before the input voltage is high enough to switch transistors Q2 and Q6 into an ohmic conductive state with low voltage drop. Because of the current flow through the respective body diode, slightly increased power loss may temporarily occur. Through selection of the starting voltage of the normally-off transistors, the losses can be minimized. However, in most power supply applications a power factor correction which enables a current to flow on the AC input lines is used. This current is also sinusoidal and in phase with a sinusoidal AC line voltage so that during and close to the zero crossing of the AC line voltage the line current flowing through the full wave rectifier is also low. This helps to minimize the losses even when the current flows through the body diodes for a short period of time. No such minimization has been applied in the rectifier that forms the basis for the diagrams shown in FIG. 2.

Figure 3:
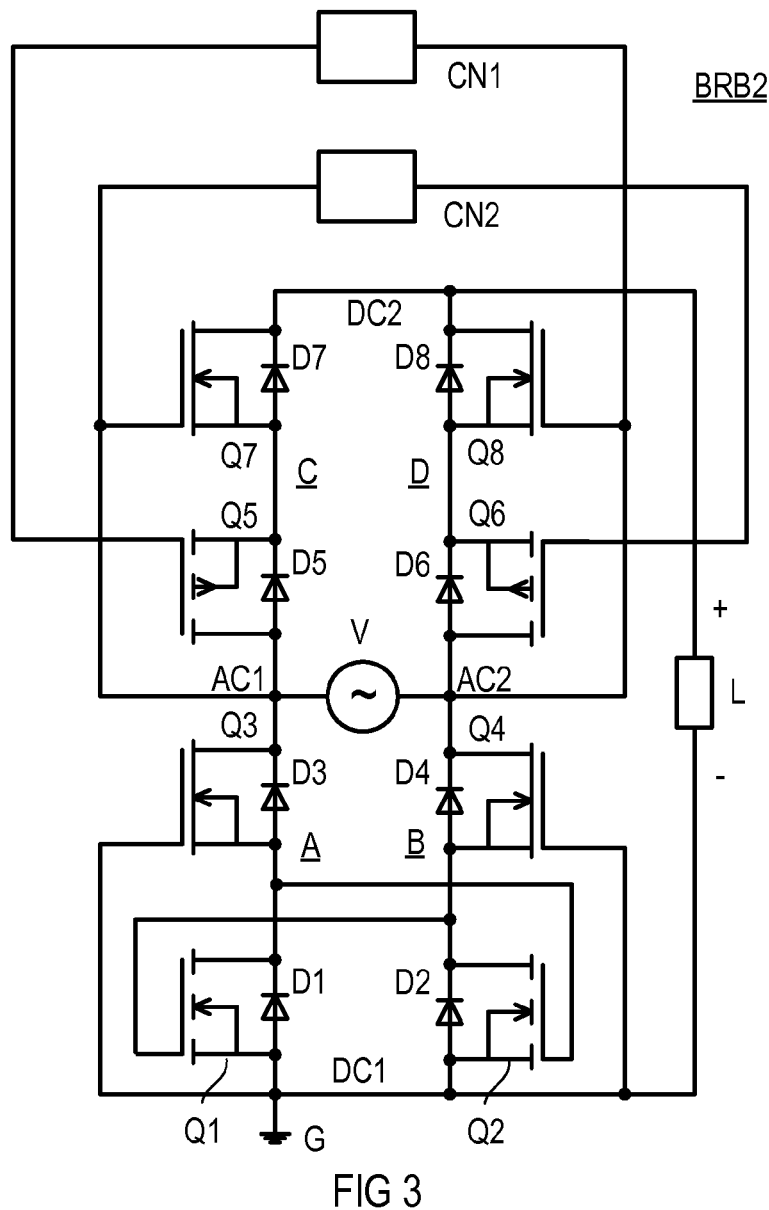
FIG. 3 is a circuit diagram of an alternative full-wave rectifier based on the full-wave rectifier shown in FIG. 1.
Figure 4:
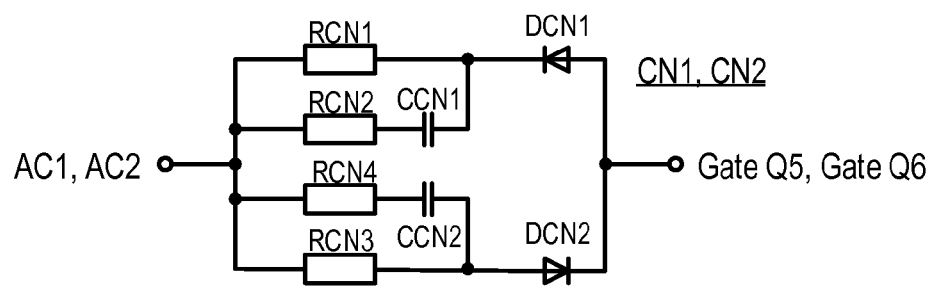
FIG. 4 is a circuit diagram of an alternative full-wave rectifier with two transistors in each rectifying path.

FIG. 3 depicts an alternative rectifier circuit BRB2 based on the rectifier circuit BRB1 shown in FIG. 1. In contrast to the rectifier circuit BRB1, the gate lines of transistors Q5 and Q6 in the rectifier circuit BRB2 are not connected to the drain lines of transistors Q1 and Q2 but are coupled via coupling networks CN1 and CN2 to input path AC2 and input path AC1, respectively. The coupling networks CN1 and CN2 are configured to process the signals supplied to the gate lines so that the switching operations of transistors Q5 and Q6 are performed after a certain delay time. The delay times for switching-on and switching-off may be different. For example, the delay time for switching off may be shorter than the delay time for switching on.

The coupling networks CN1 and CN2 may be identical and comprise a resistor RCN1 which is connected in series with a diode DCN1 for switching-on the respective normally-off p-channel field effect transistor Q6, Q5. An optional series connection of a resistor RCN2 and a capacitor CCN1 may form a frequency dependent bypass for resistor RCN1 in order to accelerate the turn-on of the respective normally-off p-channel field effect transistors Q6, Q5. The series connection of resistor RCN2 and capacitor CCN1 may be used to reduce turn-on delay of normally-off p-channel transistor Q5 without reducing the resistance of resistor RCN1 and thus without causing higher control losses especially at higher voltages between the input paths AC1 and AC2. The coupling networks CN1 and CN2 may further comprise a resistor RCN3 which is connected in series with a diode DCN2 for turning-off the respective normally-off p-channel field effect transistors Q6, Q5. An optional series connection of a resistor RCN4 and a capacitor CCN2 may form a frequency dependent bypass for resistor RCN3 in order to accelerate turn-off of the respective normally-off p-channel field effect transistors Q5, Q6. The gate lines of the normally-off p-channel field effect transistors Q5, Q6 may be protected against overvoltage, e.g., by way of anti-serial connected Zener or avalanche diodes coupled with the respective source lines of the normally-off p-channel field effect transistors Q5, Q6 (not shown in the Figures).

When alternating voltage source V provides a voltage with a positive polarity on input line AC1 and a negative polarity on input line AC2, the potential at the source of transistor Q5 (i.e., in output path DC2) is theoretically more negative than that in input path AC1 by approximately the sum of the forward voltages of body diodes D5 and D7. As transistor Q5 is a normally-off transistor, the actual difference of the potentials may be approximately the same value as the forward voltage of body diode D5.

The voltage occurring between input path AC2 and input path AC1 is in this case negative and is applied to the gate-source path of the normally-off p-channel transistor Q5 via coupling network CN1. Since the source line of transistor Q5 is only slightly negative compared to the drain of transistor Q5 because the conducting body diode D5, coupling network CN2 is able to discharge the gate of transistor Q5 to an even more negative value via diode DCN1 and resistor RCN1. Thus transistor Q5 will be rendered into conducting state and body diode D5 is bridged by the conducting drain-source-path of transistor Q5. Since gate source voltage of normally-on transistor Q7 is supplied by the drain-source voltage of transistor Q5, transistor Q7 will also be in conducting state and body diode D7 will be bridged by transistor Q7.

In this operating condition, the coupling network CN2 applies the positive voltage of input path AC1 to the gate line of normally-off p channel transistor Q6 via diode DCN2 and resistor RCN3 resulting in a gate source voltage of transistor Q6. The gate line of transistor Q6 is more positive than the (negative) threshold voltage of transistor Q6 so that transistor Q6 is in blocking state. The optional bypass with the series connection of resistor RCN4 and capacitor CCN2 may be used to reduce the turn-off delay of transistor Q6 without the necessity of reducing the resistance of resistor RCN3 and thus without causing higher control losses, e.g., at higher voltages between the input terminals AC1 and AC2.

The voltage between input paths AC1 and AC2 is approximately the same as the voltage between the drain line of normally-on n-channel transistor Q8 and the drain line of normally-off p channel transistor Q6. In this operating state, both transistor Q6 and transistor Q8 block and thus divide the voltage between the first input path AC1 and the first output path DC1 at the node between their drain lines. A current flowing through load L via the second output path DC2 and input path AC1 may cause a voltage drop between output path DC2 and input path AC1 which is defined by the parallel connection of the body diodes D5 and D7 with the channels of transistors Q5 and Q7, which exhibit ohmic behavior.

Figure 5:
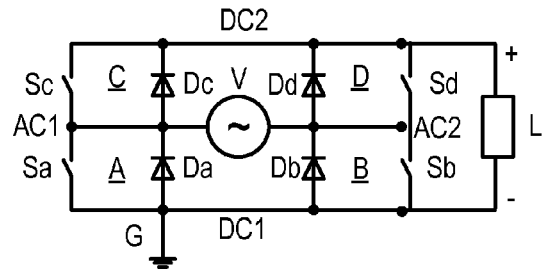
FIG. 5 is a simplified equivalent circuit diagram of the full-wave rectifier shown in FIG. 1.

FIG. 5 is a simplified equivalent circuit diagram of the full-wave rectifiers shown in FIGS. 1 and 3. Alternating voltage source V is connected via a diode bridge with diodes Da, Db, Dc and Dd to load L. Diodes Da, Db, Dc and Dd may be representative of the body diodes D1-D8 of transistors Q1-Q8. Each of the diodes Da, Db, Dc and Dd comprises a bypass switch Sa, Sb, Sc or Sd, whereby switches Sa, Sb, Sc and Sd are formed by the corresponding cascode circuits with transistors Q1-Q8. In other words, each of the diodes Da, Db, Dc and Dd may be a single diode or a series connection of at least two diodes or body diodes. Also, the switches Sa, Sb, Sc and Sd may each be realized as a single switch or a series connection of at least two switches. Accordingly, each rectifying path A, B, C and D includes a parallel connection of a switch Sa, Sb, Sc or Sd and a diode Da, Db, Dc or Dd. For example, switches Sa, Sb, Sc and Sd and thus the corresponding rectifying paths A, B, C and D may connect input path AC1 to output path DC1 and input path AC2 to output path DC2 during one half wave of the input voltage, and they may connect input path AC1 to output path DC2 and input path AC2 to output path DC1 during the other half wave of the input voltage.

Figure 6:
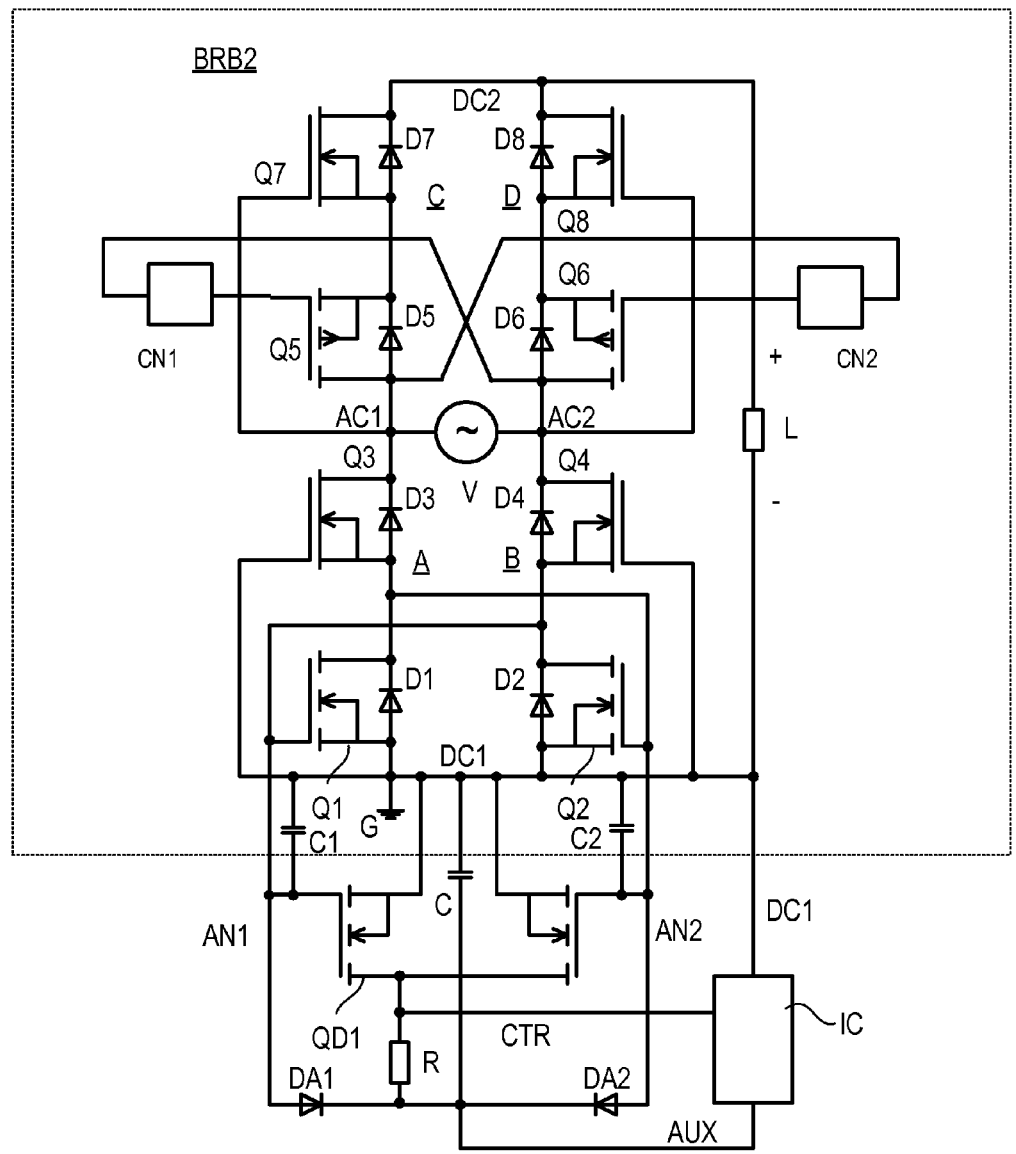
FIG. 6 is a circuit diagram of a full-wave rectifier as shown in FIG. 1 with an additional auxiliary voltage circuit and a voltage detector.

FIG. 6 depicts an exemplary bridge rectifier with an additional auxiliary output path AUX based on the bridge rectifier BRB2 shown in FIG. 3. The auxiliary output path AUX is supplied with an auxiliary output voltage by an auxiliary voltage circuit which includes in the present example two diodes DA1 and DA2 as rectifier elements. Diode DA1 is connected between the auxiliary output path AUX and an auxiliary output node AN1 which is connected to the drain line of transistor Q2 and the gate line of transistor Q1. Diode DA2 is connected between the auxiliary output path AUX and an auxiliary output node AN2 which is connected to the drain line of transistor Q1 and the gate line of transistor Q2. As long as the voltage at the auxiliary output path AUX is lower than the voltage at auxiliary output node AN1 or auxiliary output node AN2, the corresponding diode DA1, DA2 is in forward operation and may conduct a current as long as the corresponding normally-on transistor Q3, Q4 is in a conducting mode.

Figure 7:
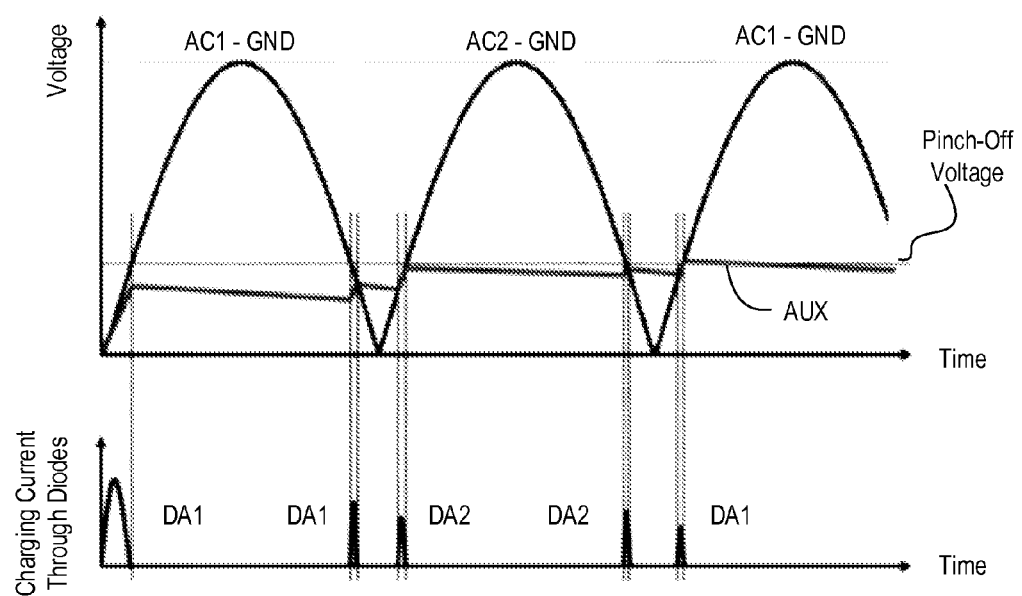
FIG. 7 is a voltage timing diagram illustrating the characteristics of the auxiliary voltage AUX relative to the input voltage.

FIG. 7 shows the voltages at the input paths AC1 and AC2 related to ground G over time. As in many AC grids these input voltages may show a sinusoidal characteristic. Assuming capacitor C being not charged in the beginning (voltage AUX=0V) in this example, a rising voltage at the input path AC1 brings a current to flow through diode DA1 until the voltage at the auxiliary output node AN1 reaches the pinch-off voltage between source and gate of the normally-on transistor Q3 and thus renders normally-on transistor Q3 into blocking state so that the current stops flowing through diode DA1. When the voltage at the input path AC1 drops below the pinch-off voltage of the normally-on transistor Q3, transistor Q3 will again be in a conducting state and again a current will flow through diode DA1 until the voltage at input path AC1 falls below the voltage at the auxiliary output path AUX and the diode DA1 is rendered into blocking mode. Subsequently, the voltage at input path AC2 rises. When the voltage at input path AC2 reaches the voltage of the auxiliary output path AUX the diode DA2 is in a conducting state and a current flows until the voltage at input path AC2 reaches the pinch-off voltage of the normally-on transistor Q4. The circuit providing the auxiliary voltage can also be configured to provide a negative auxiliary voltage AUX.

In the example shown in FIG. 7, it takes two half waves of the input voltage at the input paths AC1, AC2 to charge capacitor C up to the pinch-off voltage of the corresponding normally-on transistors Q3, Q4. But this is only an example and depending on the value of the capacitor C, a current flowing from the capacitor C into connected loads and the on-state resistance of the corresponding normally-on transistors Q3, Q4 which may vary during time depending on the actual gate-source voltage of the normally-on transistors Q3, Q4 which may have a negative polarity. As a consequence, the voltage at the output path AUX may already reach the pinch-off voltage of the normally-on transistors Q3, Q5 during the first half wave of the input voltage, or at a later time (e.g., during the second, the third, or one of the following half waves of the input voltage). As one possibility, the voltage at the output path AUX may only temporarily or never reach the pinch-off voltage of the normally-on transistors Q3, Q5.

In the circuit providing the auxiliary voltage the capacitor C is only charged when the voltages at the input paths AC1, AC2 are in the same range as the voltage at the auxiliary output path AUX and thus no significant losses occur while supplying a charge to the capacitor C. When the input voltages AC1, AC2 are substantially higher than the voltage at the auxiliary output path AUX current flow is blocked by transistors Q3, Q4.

In order to smooth the auxiliary output voltage a capacitor C may be connected between the auxiliary output path AUX and ground G to which output path DC1 is also connected. The voltage at capacitor C may be limited e.g., by using Zener or avalanche diodes parallel to the capacitor. Alternatively or additionally, an additional switch may be situated between one pin of capacitor C and the cathodes of diodes DA1 and DA2, which is only conducting as long as a maximum voltage at capacitor C is not exceeded. In the present example, diodes DA1 and DA2 are connected with their cathodes to the auxiliary output path AUX, however with other circuit structures the anodes cathodes may be connected to the auxiliary output path, as well.

The auxiliary voltage may be supplied to a circuit IC that may be a control circuit, stand-by circuit, start-up circuit, zero crossing detector or any other circuitry that needs to be supplied with power when the bridge rectifier block BRB2 as a whole is not active. The auxiliary voltage is only connected to the voltages at input paths AC1, AC2 when there is only little voltage difference so that a low ohmic connection may be realized. This is in contrast to conventional stand-by or start-up supplies in which a current flowing from the input voltages to the auxiliary voltage needs to be limited by rather high ohmic resistors in the range of more than 10 k$\Omega$, sometimes even more than 100 k$\Omega$, so that the current is limited to a few mA up to e.g., 10 mA in power applications. It takes a relatively long time for the capacitor C to become sufficiently charged by the auxiliary voltage. In contrast, by charging the capacitor C only at times during which the input voltage is only slightly higher than the auxiliary voltage, the connection may be realized low-ohmic, thus leading to charging currents in the range of more than 10 mA, some 10 mA, 100 mA or even more, thus reducing the time delay at start-up to approximately 1/10 of conventional approaches in power applications. In contrast to conventional start-up or stand-by supplies, charging capacitor C at input voltages that are only slightly higher than the voltage at the auxiliary output AUX causes no significant losses, so that the voltage at the auxiliary path may not only be used for start-up and stand-by supplies but also for regular operation of auxiliary loads such as control circuits and the like. In this case, additional circuitry usually needed to supply auxiliary loads (e.g., control circuits) such as transformers or high-voltage capacitors is not required.

Optional capacitors C1 and C2 may be connected between auxiliary output nodes AN1, AN2 and ground G to allow for an additional charge stored in these capacitors to be discharged to the auxiliary output path AUX when the drain source voltage of the respective transistor Q1 or Q2 increases. When the difference between the input AC voltage from alternating voltage source V and the auxiliary voltage appearing on the auxiliary output path AUX is small, the charge of the (low-voltage) capacitors C1 and C2 may establish a voltage approximating that of the auxiliary voltage so that voltage losses are negligible. In other words, the capacitors C1 and C2 may reduce the feedback to the gates of Q1 or Q2 which a current flow via the diodes DA1 or DA2 to the capacitor C may have. Capacitors C1 and C2 may have only lesser capacitances since they are mainly intended to suppress noise, transients and interferences and would otherwise decrease the efficiency of the circuit.

The circuit IC may require information about the current input AC voltage from alternating voltage source V, e.g., if the input AC voltage exceeds a first threshold or drops below a second threshold. In order to provide such information, two voltage detection transistors, which are in the present case normally-off n-channel field-effect transistors QD1 and QD2, are connected between the auxiliary output nodes AN1, AN2 and a control path CTR is connected to a corresponding input of the circuit IC. For example, a pull-up resistor R is connected between the control path CTR and the auxiliary output path AUX. The control path CTR is further coupled with the drain lines of transistors QD1 and QD2 whose source lines are connected to ground G (i.e., output path DC1). The gate line of transistor QD1 is connected to the auxiliary output node AN1 and the gate line of transistor QD2 is connected to the auxiliary output node AN2.

When the voltage at the gate line of transistor Q1 exceeds the turn-on voltage of transistor QD1, transistor QD1 is turned on into a conductive state. Then the voltage at a node connecting the drain lines of transistors QD1, QD2 and resistor R drops to the level of output path DC1 (ground G). The voltage level (potential) at the control path CTR drops to almost 0V so that a voltage increase following a voltage zero crossing can be detected. The threshold level for zero crossing detection can be shifted to a desired level, e.g., by way of Zener diodes, avalanche diodes and/or additional resistors.

Instead of the example shown in FIG. 6 different approaches may be used for zero crossing detection with the detection transistors QD1, QD2. For example, both of the transistors QD1, QD2 may be supplied with a separate pull-up resistor R and the separate drain signals of the transistors QD1, QD2 may be fed separately via two control paths CTR into the circuit IC, delivering not only information about the zero crossing but also about which of the input paths AC1 or AC2 has a positive voltage. In an alternative example, the pull-up resistor R or the pull-up resistors in case of separate drain nodes may be omitted resulting in so-called open-drain transistors which may be used for zero crossing detection via a pull-down of a voltage at the control path CTR to ground G. The circuit providing the auxiliary voltage may be further configured and adapted to provide additional functions such as providing a multiplicity of auxiliary paths with different voltages (higher, lower, positive, negative) with little power loss and to allow for zero-voltage crossing detection.

Figure 8:
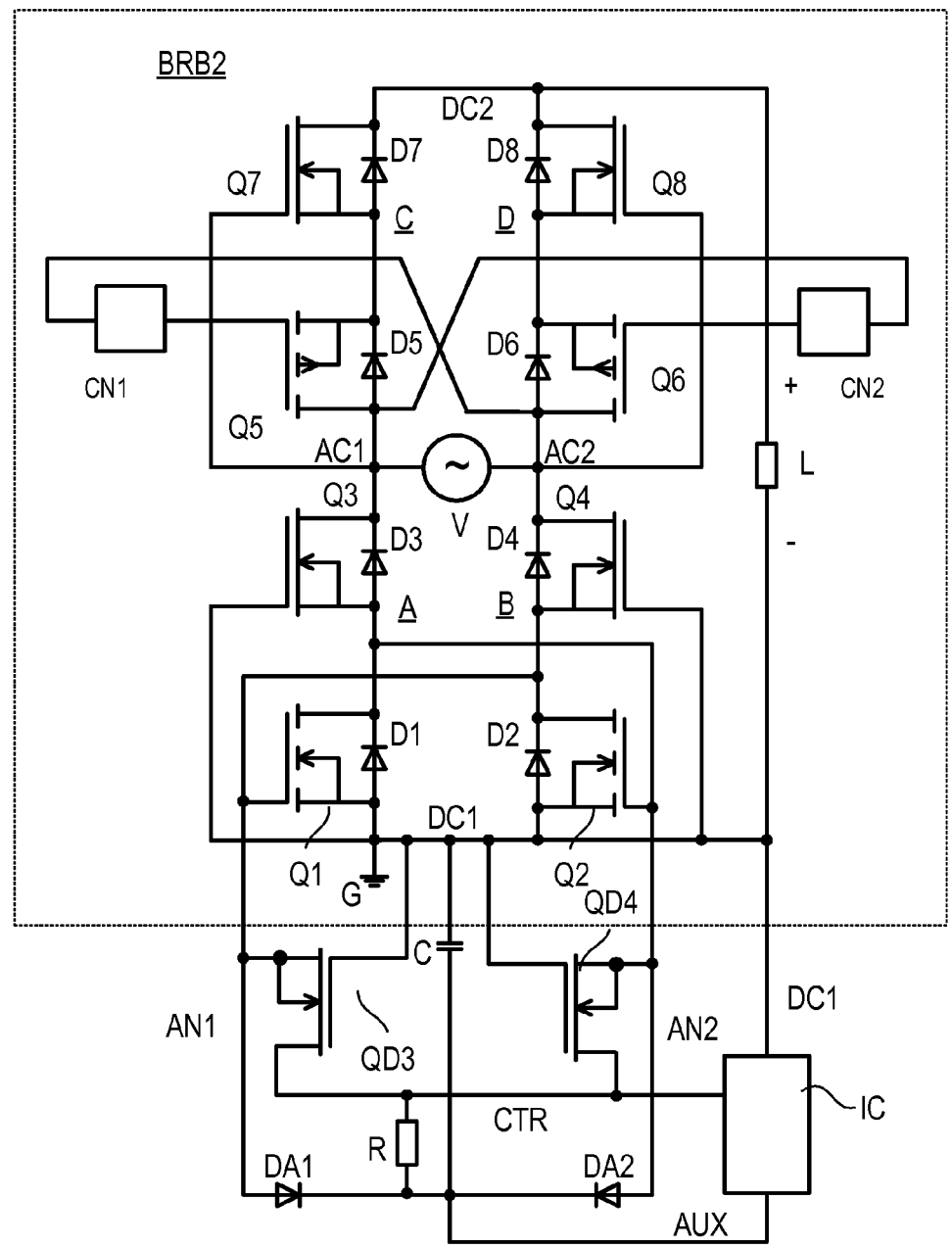
FIG. 8 is a circuit diagram of a full-wave rectifier as shown in FIG. 1 with an additional auxiliary voltage circuit and an alternative voltage detector.

As shown in FIG. 8, normally-on n-channel field-effect transistors QD3 and QD4 may be alternatively used as voltage detection transistors instead of the normally-off n-channel field-effect transistors QD1 and QD2 employed in the rectifier shown in FIG. 3. The control path CTR is coupled with the drain lines of transistors QD3 and QD4 whose gate lines are connected to ground G (i.e., output path DC1). The source line of transistor QD3 is connected to the auxiliary output node AN1 and the source line of transistor QD2 is connected to the auxiliary output node AN2.

Figure 9:
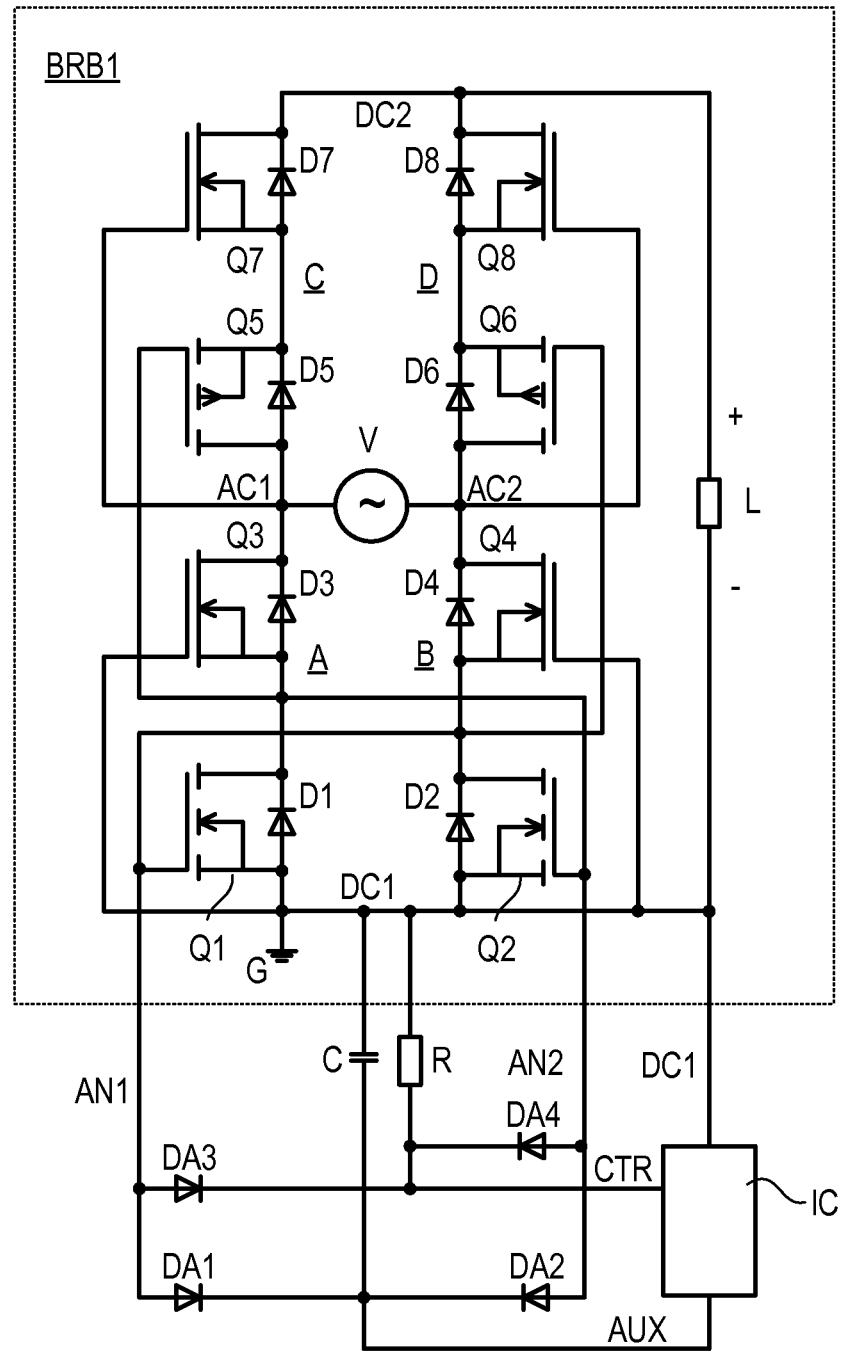
FIG. 9 is a circuit diagram of a full-wave rectifier as shown in FIG. 1 with an additional auxiliary voltage circuit providing two auxiliary voltages.

Alternatively, other types of transistors in connection with an accordingly adapted circuit structure may be used as detection transistors. Furthermore, a multiplicity of series or parallel connected transistors may be used as detection transistors, i.e., instead of transistors QD1-QD4. Instead of transistors, diodes DA3 and DA4 may be used for voltage detection as shown in FIG. 9. The diodes DA3 and DA4 may be connected between the control path CTR and the auxiliary output nodes AN1, AN2. If it is sufficient to detect only each second zero crossing, only one of transistors QD1-QD4 may be employed. The bridge rectifier circuit BRB1 may be used instead of rectifier circuit BRB2 as shown in FIG. 9. In the rectifying paths C and D alternatively or additionally, further parallel or series connected diodes (not shown) may be used. Furthermore, in some or all switching paths more than two transistors per path may be used as described below in connection with FIG. 10.

Figure 10:
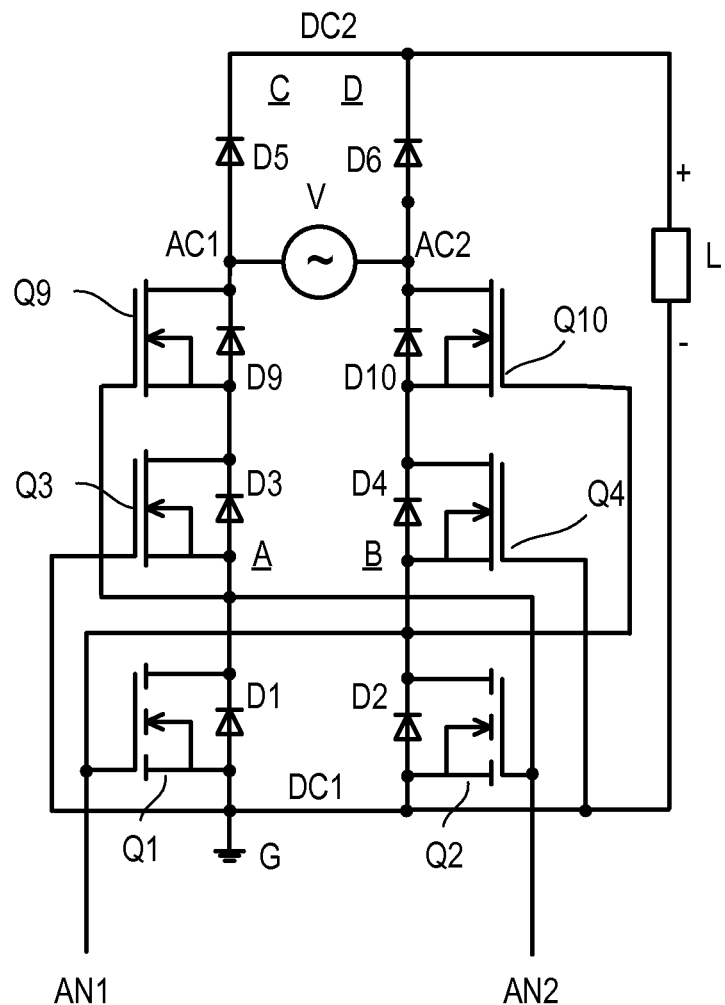
FIG. 10 is circuit diagram of a full-wave rectifier with three transistors in each rectifying path as an alternative to the full-wave rectifier shown in FIG. 1.

Referring to FIG. 10, which shows an alternative bridge rectifying circuit BRB3, the full-wave rectifier BRB1 shown in FIG. 1 may be enhanced by adding another normally-on field-effect transistor Q9 and Q10 to each of the switching rectifying paths (switched-mode rectifying paths) to increase the blocking capabilities in each of the rectifying paths A and B. In particular, the source-drain path of transistor Q9 is connected between the drain line of transistor Q3 and input path AC1. The gate line of transistor Q9 is connected to the source line of transistor Q3. The source-drain path of transistor Q10 is connected between the drain line of transistor Q4 and input path AC2. The gate line of transistor Q10 is connected to the source line of transistor Q4. In each rectifying path C and D shown in FIG. 10 a diode D5, D6 is connected between input paths AC1, AC2 and DC2, thus establishing a bypass of a pn-junction threshold only in rectifying paths A and B so that switching elements may be omitted in the rectifying paths C and D.

As an alternative (not shown), instead of single diodes D5, D6 a series connections of two or more diodes may be used to increase the blocking capabilities in each of the rectifying paths C and D over a single diode at the expense of higher conduction losses.

It is noted that all bridge rectifiers BRB1, BRB2 and BRB3 are interchangeable in the examples described above depending on the application. Furthermore, the paths A, B can be combined with any paths C, D described herein and with many other conventional rectifying paths.

In the examples shown in FIGS. 6, 8 and 9, zero voltage detection and/or auxiliary supply to capacitor C is designed symmetrically from both auxiliary nodes AN1 and AN2. As an alternative at least one of zero voltage detection and/or auxiliary supply to capacitor C may be realized only via one of the auxiliary nodes AN1 and AN2, e.g., capacitor C is connected to auxiliary node AN1 via rectifying element DA1 and control path CTR is connected to auxiliary node AN2 via rectifying element DA4 or switching element QD2 or QD4.

The full-wave rectifiers described above may be applicable in connection with ohmic loads or subsequent buck and/or boost converters such as power factor controllers. For example, in a power factor controller the intermediate stage capacitor is uncoupled from the input (full-wave) rectifier and an inductor by a buck/boost diode so that there is no reverse current flowing from the intermediate stage capacitor to the input (e.g., the power grid), which would otherwise be the case when applying a capacitive load directly.

The full-wave rectifiers described above have a bridge-like structure with cascode circuits whose load paths form the rectifying paths. Cascode circuits sharing the same input path and/or cascode circuits sharing ground (corresponding to one of the output paths) may be cross-coupled with each other via the cascode circuit inputs and intermediate outputs of the cascode circuits. The cascode circuits may employ transistors of only a single conductivity type or of both types, e.g., only p-channel transistors, only n-channel transistors or both. The transistors in the cascodes may be of the normally-on type or the normally-off type due to their function within the cascode circuit. For example, the normally-on transistors may be used to increase the proof voltage, and the (cross-coupled) normally-off transistors may be used to control switching off the rectifier. The number of transistors per rectifying path in the above examples is 2 or 3 but may be likewise any number higher than 3.

While various embodiments of the invention have been described, it will be apparent to those of ordinary skill in the art that many more embodiments and implementations are possible within the scope of the invention.

The invention claimed is:

1. A rectifier comprising:
   two input paths configured to receive an alternating input voltage;
   two output paths configured to provide a direct output voltage;
   an auxiliary output path configured to provide an auxiliary output voltage;

at least two rectifying paths that are connected between each of the input paths and each of the output paths, wherein two of the at least two rectifying paths are switched-mode rectifying paths, the two switched-mode rectifying paths being connected to the one same output path;

the two switched-mode rectifying paths are configured to connect one output path to one input path during one half wave of the input voltage, and configured to connect the one output path to the other input path during the other half wave of the input voltage;

the two switched-mode rectifying paths each comprise a semiconductor element with controllable paths;

the controllable paths of the two semiconductor elements in each of the two switched-mode rectifying paths are series-connected with each other via a corresponding auxiliary output node; and at least one rectifier element is connected between the auxiliary output and at least one of the two auxiliary output nodes.

2. The rectifier of claim 1, further comprising at least one additional semiconductor element in each of the two of the switched-mode rectifying paths, wherein the additional semiconductor elements comprise controllable paths that are series-connected with the series-connected controllable paths of the two semiconductor elements in the two of the switched-mode rectifying paths.

3. The rectifier of claim 1, wherein the semiconductor elements are transistors.

4. The rectifier of claim 1, further comprising a voltage detector that is
   connected to at least one of the two auxiliary output nodes,
   configured to detect if the auxiliary voltage exceeds a threshold voltage, and
   configured to provide a detector output signal on a detector output path to indicate if the auxiliary voltage exceeds a threshold voltage.

5. The rectifier of claim 4, wherein the voltage detector comprises at least one of:
   a first detector transistor having a controllable path and a controlling path, the controllable path being connected between one of the two output paths and the detector output path, and the controlling path being connected to one of the two auxiliary output nodes; and
   a second detector transistor having a controllable path and a controlling path, the controllable path being connected between the one output path and the detector output path, and the controlling path being connected to other of the two auxiliary output nodes.

6. The rectifier of claim 4, wherein the voltage detector comprises at least one of:
   a third detector transistor having a controllable path and a controlling path, the controllable path being connected between one of the two auxiliary output nodes and the detector output path, and the controlling path being connected to one of the two output paths; and
   a fourth detector transistor having a controllable path and a controlling path, the controllable path being connected between the other of the two auxiliary output nodes and the detector output path, and the controlling path being connected to the one output path.

7. The rectifier of claim 4, further comprising circuitry that is controlled dependent on a signal status of the detector output signal.

8. The rectifier of claim 1, further comprising a capacitor that is connected between the auxiliary path and one of the two input paths.

9. The rectifier of claim 1, further comprising additional rectifier elements that are connected between an additional auxiliary output and the two auxiliary output nodes.

10. The rectifier of claim 1, wherein the two switched-mode rectifying paths each comprise a cascode circuit with a normally-off transistor and a normally-on transistor, the normally-off transistor and the normally-on transistor being of the same conductivity type.

11. The rectifier of claim 10, wherein in the two switched-mode rectifying paths,
    the normally-off transistors and the normally-on transistors are field-effect transistors with gate, source and drain lines;
    the cascode circuits each comprise a series connection of a common-source stage and a common-gate stage;
    the normally-off transistors are configured to be the common-source stages of the cascode circuits; and
    the normally-on transistors are configured to be the common-gate stages of the cascode circuits.

12. The rectifier of claim 11, wherein in the two switched-mode rectifying paths,
    the source lines of the normally-off transistors in the two switched-mode rectifying paths are connected to the same output path; and
    the gate lines of the normally-off transistors in the two switched-mode rectifying paths are coupled with the drain lines of the normally-off transistor in the respective other rectifying path.

13. The rectifier of claim 1, further comprising two additional rectifying paths that are connected between each of the input paths and each of the output paths, wherein
    the switch-mode rectifying paths and the additional rectifying paths are configured to connect one input path to one output path and the other input path to the other output path during one half wave of the input voltage, and configured to connect the first input path to the second output path and the second input path to the first output path during the other half wave of the input voltage; and
    the two additional rectifying paths are connected to the same other output path.

14. The rectifier of claim 13, wherein the two additional rectifying paths are switched mode rectifying paths.

15. The rectifier of claim 13, wherein the two additional rectifying paths each comprise at least one diode.

16. The rectifier of claim 14, wherein the two additional rectifying paths each comprise a cascode circuit with a normally-off transistor and a normally-on transistor, the normally-off transistor and the normally-on transistor being of different conductivity types.

17. The rectifier of claim 16, wherein the gate line of the normally-off transistor in one of the two additional rectifying paths are coupled via a coupling network with the drain line of the normally-off transistor in respective other additional rectifying path and vice versa.

18. The rectifier of claim 17, wherein the coupling networks are configured to provide a signal delay time.

19. The rectifier of claim 18, wherein the coupling networks are configured to provide different signal delay times for rising and falling edges of a signal.

20. The rectifier of claim 17, wherein the coupling networks comprise a resistor-capacitor network.

21. A rectifier comprising:
    two input paths configured to receive an alternating input voltage;
    two output paths configured to provide a direct output voltage;

an auxiliary output path configured to provide an auxiliary output voltage;

four rectifying paths that are connected between each of the input paths and each of the output paths, wherein two of the four rectifying paths are switched-mode rectifying paths, the two switched-mode rectifying paths are connected to the one same output path;

the rectifying paths are configured to connect one input path to one output path and the other input path to the other output path during one half wave of the input voltage, and configured to connect the first input path to the second output path and the second input path to the first output path during the other half wave of the input voltage;

the two switched-mode rectifying paths each comprise a semiconductor element with controllable paths;

the controllable paths of the two semiconductor elements in each of the two switched-mode rectifying paths are series-connected with each other via a corresponding auxiliary output node; and at least one rectifier element is connected between the auxiliary output and at least one of the two auxiliary output nodes.

22. The rectifier of claim 21, further comprising at least one additional semiconductor element in each of the two of the switched-mode rectifying paths, wherein the additional semiconductor elements comprise controllable paths that are series-connected with the series-connected controllable paths of the two semiconductor elements in the two of the switched-mode rectifying paths.

23. The rectifier of claim 21, further comprising a voltage detector that is
- connected to at least one of the two auxiliary output nodes,
- configured to detect if the auxiliary voltage exceeds a threshold voltage, and
- configured to provide a detector output signal on a detector output path to indicate if the auxiliary voltage exceeds a threshold voltage.

24. The rectifier of claim 23, wherein the voltage detector comprises at least one of: a first detector transistor having a controllable path and a controlling path, the controllable path being connected between one of the two output paths and the detector output path, and the controlling path being connected to one of the two auxiliary output nodes; and a second detector transistor having a controllable path and a controlling path, the controllable path being connected between the one output path and the detector output path, and the controlling path being connected to other of the two auxiliary output nodes.

25. The rectifier of claim 23, wherein the voltage detector comprises at least one of: a third detector transistor having a controllable path and a controlling path, the controllable path being connected between one of the two auxiliary output nodes and the detector output path, and the controlling path being connected to one of the two output paths; and a fourth detector transistor having a controllable path and a controlling path, the controllable path being connected between the other of the two auxiliary output nodes and the detector output path, and the controlling path being connected to the one output path.

* * * * *